United States Patent
Lin et al.

(10) Patent No.: US 10,870,374 B2
(45) Date of Patent: Dec. 22, 2020

(54) VEHICLE SEAT ASSEMBLY INCLUDING A SEAT COVER ENCLOSING A SEAT CUSHION AND A VALVE EXTENDING THROUGH THE SEAT COVER AND REGULATING AIRFLOW OUT OF THE SEAT CUSHION

(71) Applicant: GM GLOBAL TECHNOLOGY OPERATIONS LLC, Detroit, MI (US)

(72) Inventors: Chin-Hsu Lin, Troy, MI (US); Ashish Nayak, Bhopal (IN); Nilesh D. Mankame, Ann Arbor, MI (US); Dorel M. Sala, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/421,799

(22) Filed: May 24, 2019

(65) Prior Publication Data
US 2020/0369184 A1  Nov. 26, 2020

(51) Int. Cl.
| B60N 2/02 | (2006.01) |
| B60N 2/42 | (2006.01) |
| B60N 2/58 | (2006.01) |
| B60N 2/427 | (2006.01) |
| B60N 2/90 | (2018.01) |

(52) U.S. Cl.
CPC ......... B60N 2/4221 (2013.01); B60N 2/0276 (2013.01); B60N 2/4279 (2013.01); B60N 2/5875 (2013.01); B60N 2/914 (2018.02); B60N 2002/026 (2013.01)

(58) Field of Classification Search
CPC .. B60N 2/0276; B60N 2/4221; B60N 2/4279; B60N 2/914; B60N 2/5875
USPC .......................................... 297/284.6, 452.41
See application file for complete search history.

(56) References Cited

U.S. PATENT DOCUMENTS

| 4,516,788 | A | * | 5/1985 | Umetsu | A47C 7/467 |
| | | | | | 297/284.6 X |
| 4,655,505 | A | * | 4/1987 | Kashiwamura | A47C 7/467 |
| | | | | | 297/284.6 X |
| 4,833,614 | A | * | 5/1989 | Saitoh | B60N 2/0224 |
| | | | | | 297/284.6 X |
| 5,129,704 | A | * | 7/1992 | Kishi | B60N 2/0224 |
| | | | | | 297/284.6 X |
| 5,487,197 | A | * | 1/1996 | Iskra, Jr. | A47C 7/021 |
| | | | | | 297/452.41 |
| 5,657,499 | A | * | 8/1997 | Vaughn | A61G 7/057 |
| | | | | | 297/284.6 X |
| 5,678,891 | A | * | 10/1997 | O'Neill | A47C 4/54 |
| | | | | | 297/284.6 X |
| 6,203,105 | B1 | * | 3/2001 | Rhodes, Jr. | A47C 4/54 |
| | | | | | 297/284.6 |

(Continued)

FOREIGN PATENT DOCUMENTS

DE  19938698 A1 * 2/2001 ......... B60N 2/42745

*Primary Examiner* — Rodney B White

(57) ABSTRACT

A system for a seat of a vehicle includes a seat cushion, a seat cover, and a valve. The seat cushion forms at least part of a bottom of the seat. The seat cover encloses the seat cushion and forming a barrier to airflow out of the seat cushion. The seat cover forms a top surface of the seat bottom, a bottom surface of the seat bottom, and side surfaces of the seat bottom. The valve extends through the seat cover and is configured to regulate airflow out of the seat cushion through the valve.

12 Claims, 10 Drawing Sheets

(56) References Cited

U.S. PATENT DOCUMENTS

| | | | | |
|---|---|---|---|---|
| 8,132,859 B2* | 3/2012 | Kramer | B60N 2/0244 | |
| | | | 297/452.41 X | |
| 8,474,862 B2* | 7/2013 | Pursche | B60R 21/0134 | |
| | | | 297/452.41 X | |
| 8,616,654 B2* | 12/2013 | Zenk | B60N 2/914 | |
| | | | 297/452.41 | |
| 8,678,500 B2* | 3/2014 | Lem | B60N 2/914 | |
| | | | 297/284.6 | |
| 8,944,504 B2* | 2/2015 | Zimmerman, II | B60N 2/3013 | |
| | | | 297/284.6 | |
| 9,731,638 B2* | 8/2017 | Benson | B60N 2/914 | |
| 10,384,565 B2* | 8/2019 | Dhaini | B60N 2/646 | |
| 2003/0030319 A1* | 2/2003 | Clapper | B60N 2/914 | |
| | | | 297/452.41 | |
| 2003/0038517 A1* | 2/2003 | Moran | B60N 2/914 | |
| | | | 297/284.6 X | |
| 2005/0082895 A1* | 4/2005 | Kimmig | A47C 27/10 | |
| | | | 297/452.41 | |
| 2008/0005843 A1* | 1/2008 | Lokhorst | A61G 7/05776 | |
| | | | 297/452.41 X | |
| 2008/0228358 A1 | 9/2008 | Wang et al. | | |
| 2009/0236883 A1* | 9/2009 | Sugiyama | B60N 2/0276 | |
| | | | 297/217.1 | |
| 2011/0227388 A1* | 9/2011 | Bocsanyi | B60N 2/4415 | |
| | | | 297/452.41 | |
| 2011/0272993 A1* | 11/2011 | Kilincsoy | D04B 21/14 | |
| | | | 297/452.41 | |
| 2014/0097661 A1* | 4/2014 | Loher | B60N 2/7035 | |
| | | | 297/452.41 | |
| 2014/0232155 A1* | 8/2014 | Bocsanyi | A47C 4/54 | |
| | | | 297/284.6 | |
| 2014/0284908 A1* | 9/2014 | Wellhoefer | B60N 2/0296 | |
| | | | 280/736 | |
| 2014/0346836 A1* | 11/2014 | Briggs | A61G 5/14 | |
| | | | 297/452.41 | |
| 2015/0008710 A1* | 1/2015 | Young | B60N 2/976 | |
| | | | 297/217.3 | |
| 2015/0196131 A1* | 7/2015 | Dacosta-Mallet | A47C 27/083 | |
| | | | 297/452.41 | |
| 2016/0046207 A1* | 2/2016 | Arant | B60N 2/72 | |
| | | | 297/284.6 | |
| 2016/0288681 A1* | 10/2016 | Ferretti | B60N 2/72 | |
| 2017/0043681 A1* | 2/2017 | Seiller | B60N 2/914 | |
| 2017/0088029 A1* | 3/2017 | Mizoi | B60N 2/665 | |
| 2018/0072199 A1* | 3/2018 | Strumolo | B60N 2/914 | |
| 2019/0126799 A1* | 5/2019 | Lem | B60N 2/914 | |
| 2019/0152372 A1* | 5/2019 | Fujii | A61H 9/0078 | |
| 2019/0193591 A1* | 6/2019 | Migneco | G06K 9/00335 | |
| 2019/0337412 A1* | 11/2019 | Zouzal | B60N 2/665 | |
| 2019/0351787 A1* | 11/2019 | Lodhia | B60N 2/0244 | |
| 2019/0359161 A1* | 11/2019 | Ogiso | G10L 25/78 | |
| 2019/0381918 A1* | 12/2019 | Booth | B60N 2/914 | |
| 2019/0381921 A1* | 12/2019 | Beuschel | G01L 7/00 | |
| 2020/0100599 A1* | 4/2020 | Chang | A47C 27/082 | |

* cited by examiner

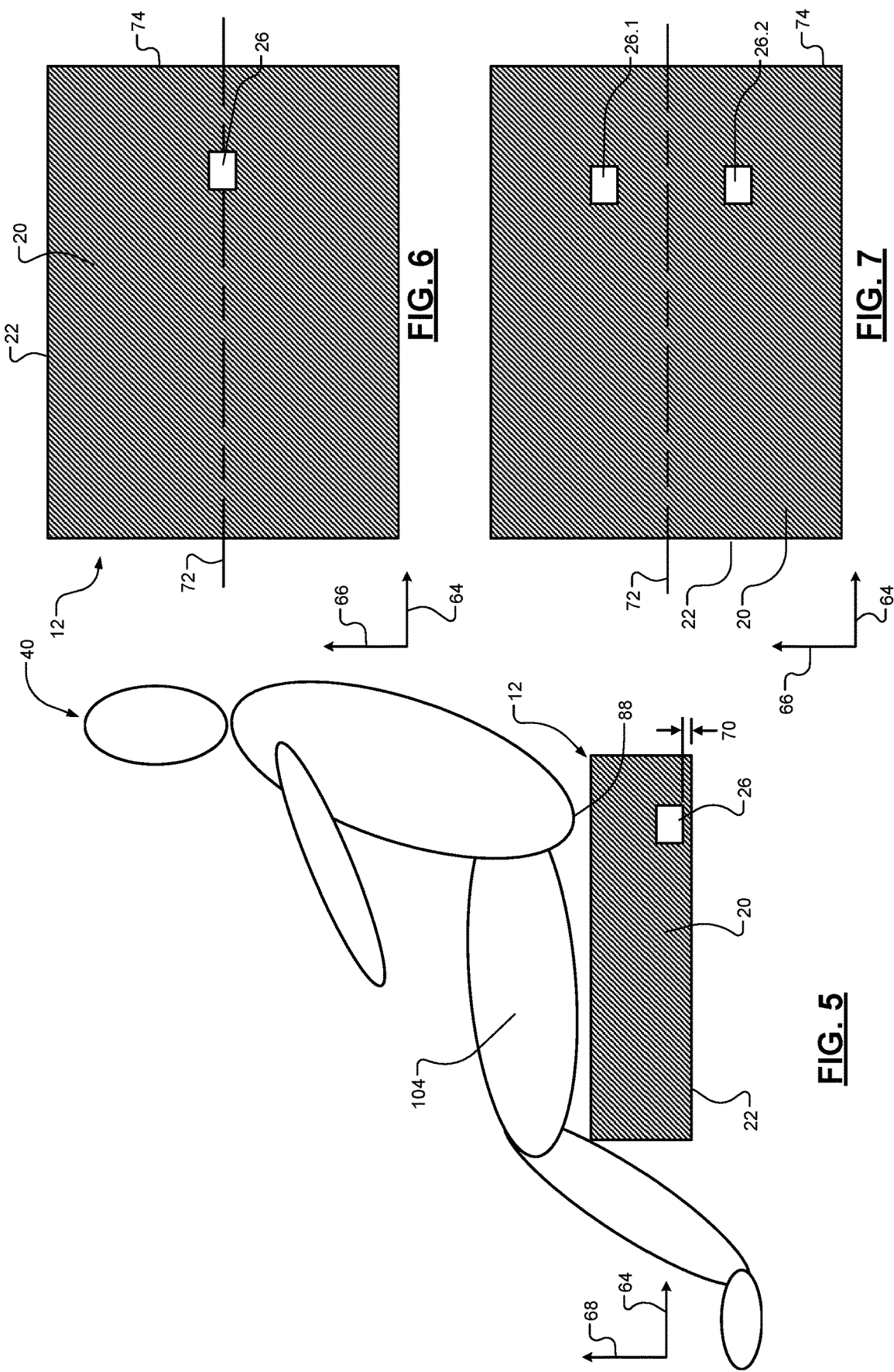

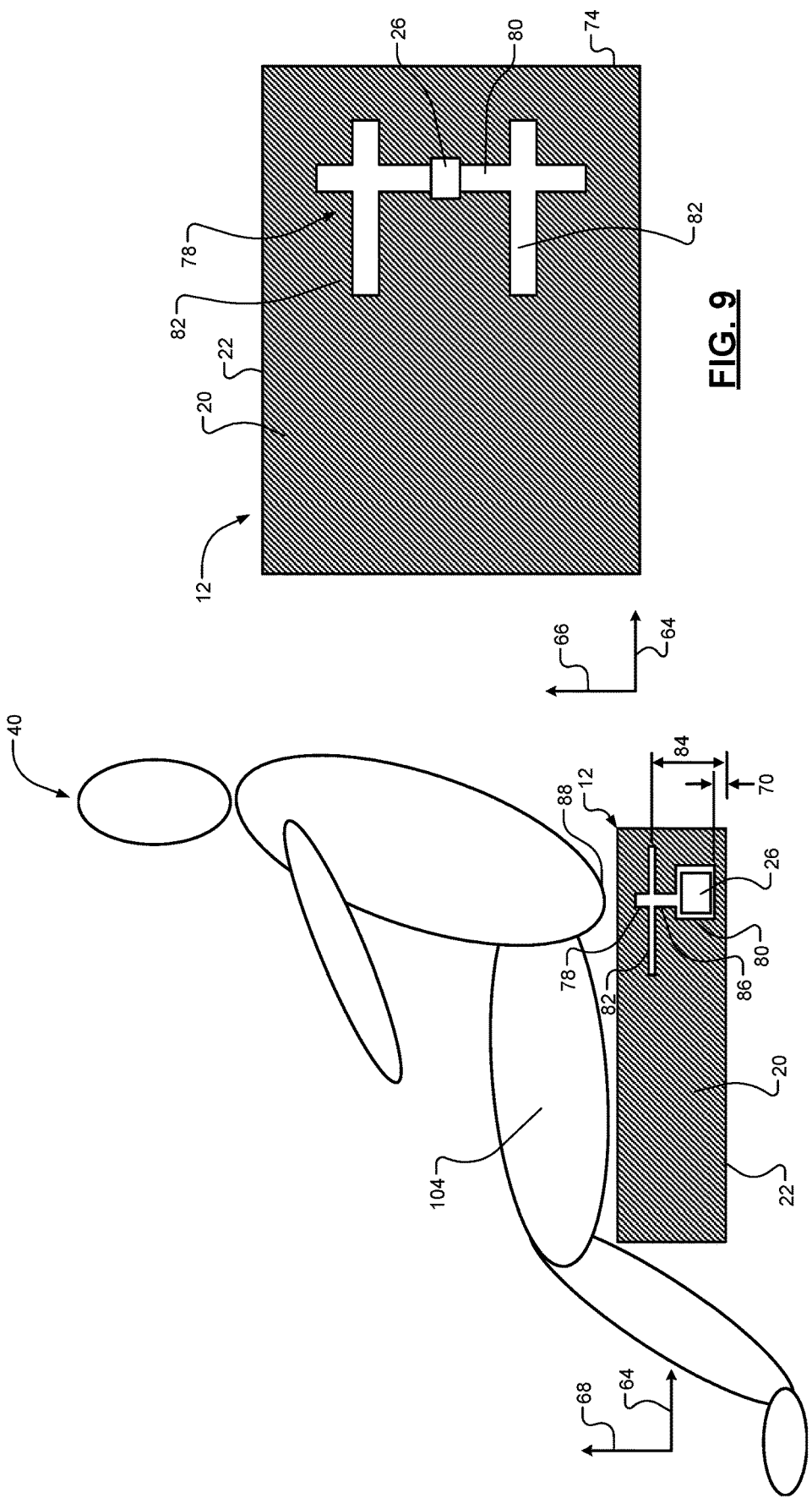

VEHICLE SEAT ASSEMBLY INCLUDING A SEAT COVER ENCLOSING A SEAT CUSHION AND A VALVE EXTENDING THROUGH THE SEAT COVER AND REGULATING AIRFLOW OUT OF THE SEAT CUSHION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle seat assemblies including a seat cover enclosing a seat cushion and a valve extending through the seat cover and regulating airflow through the seat cushion.

A seat in a vehicle typically includes a seat bottom, a seat back, a headrest, and a seat frame. The seat bottom and the seat back are mounted to the seat frame, and the headrest is attached to the seat back. The frame includes a first portion to which the seat bottom is mounted, a second portion to which the seat back is mounted, and a hinge that pivotally connects the first and second portions of the seat frame to one another.

The seat bottom includes a seat cushion made from a cushion material such as foam, and a seat cover that covers the top and sides of the seat cushion but does not cover the bottom or underside of the seat cushion. When the vehicle is involved in a frontal impact, an occupant in the seat presses down on the seat cushion, and the height of the occupant's pelvic bone relative to a seatbelt buckle associated with the seat decreases. While the stiffness of the seat cushion may be increased to reduce the amount by which the height of the occupant's pelvic bone decreases, increasing the stiffness of the seat cushion may reduce occupant comfort.

In some vehicles, a pressure sensor is placed below the seat bottom cushion to measure the weight of an occupant in the seat. The occupant's weight is used to determine, for example, whether to enable or disable an airbag for the occupant. The pressure sensor includes a bladder that sits below the seat cushion. Thus, the pressure sensor increases the overall packaging space required for the seat.

SUMMARY

A system for a seat of a vehicle according to the present disclosure includes a seat cushion, a seat cover, and a valve. The seat cushion forms at least part of a bottom of the seat. The seat cover encloses the seat cushion and forming a barrier to airflow out of the seat cushion. The seat cover forms a top surface of the seat bottom, a bottom surface of the seat bottom, and side surfaces of the seat bottom. The valve extends through the seat cover and is configured to regulate airflow out of the seat cushion through the valve.

In one example, the seat cover is air impermeable.

In one example, the seat cover completely surrounds the seat cushion except for an opening in the seat cover through which the valve extends.

In one example, the seat cover is adhered to the entire exterior surface of the seat cushion except for a top surface of the seat cushion.

In one example, the system further comprises a valve control module configured to control a position of the valve.

In one example, the system further comprises at least one pressure sensor disposed within at least one of the seat cushion and the valve and configured to measure a pressure within the seat cushion.

In one example, the at least one pressure sensor includes two pressure sensors disposed within the seat cushion at the same vertical location, the same longitudinal location, and different lateral locations.

In one example, the seat cushion defines an internal void, and the at least one pressure sensor is disposed within the internal void.

In one example, the internal void includes a lateral passage disposed at a first height, a pair of longitudinal passages disposed at a second height that is greater than the first height, and a vertical passage extending between the lateral passage and the longitudinal passages. In addition, the pressure sensor is disposed within the lateral passage.

In one example, the lateral passage and the vertical passage are configured to be located directly below a bottom of an occupant in the seat.

In one example, the internal void includes a first longitudinal passage disposed at a first height, a pair of second longitudinal passages disposed on opposite sides of the first longitudinal passage at a second height that is greater than the first height, and a vertical passage extending between the first longitudinal passage and the second longitudinal passages. In addition, the pressure sensor is disposed within the first longitudinal passage.

In one example, the first longitudinal passage has a first end configured to be disposed below thighs of an occupant in the seat and a second end configured to be disposed directly below a bottom of the occupant, and the pressure sensor is located at the first end of the first longitudinal passage.

In one example, the system further comprises an occupant weight module configured to determine a weight of an occupant in the seat based on the seat cushion pressure.

In one example, the system further comprises a door position module configured to determine a position of a door of the vehicle. In addition, the valve control module is configured to close the valve for a first period when the door is opened, and the occupant weight module is configured to determine the occupant weight based on a difference between a first value of the seat cushion pressure measured at a first time during the first period and a second value of the seat cushion pressure measured at a second time during the first period.

In one example, the system further comprises an impact detection module configured to detect when the vehicle is involved in a frontal impact based on at least one of a distance to an object in front of the vehicle, a speed of the vehicle, an acceleration of the vehicle, and a pressure within a front bumper of the vehicle. In addition the valve control module closes the valve to inhibit airflow out of the seat cushion when the vehicle is involved in a frontal impact.

Another system for a seat of a vehicle according to the present disclosure includes a seat cushion, a seat cover, and a valve. The seat cushion forms an interior portion of a bottom of the seat. The seat cover encloses the seat cushion and is air impermeable such that the seat cover forms a barrier to airflow out of the seat cushion. The seat cover forms a top surface of the seat bottom, a bottom surface of the seat bottom, and side surfaces of the seat bottom. The top surface of the seat bottom is configured to contact an occupant in the seat, and the bottom surface of the seat bottom is configured to be supported by and in direct contact with a frame of the seat. The valve extends through the seat cover and is configured to regulate airflow out of the seat cushion through the valve. The seat cover completely surrounds the seat cushion except for an opening in the seat cover through which the valve extends.

In one example, the system further comprises a valve control module configured to control a position of the valve.

In one example, the system further comprises at least one pressure sensor disposed within at least one of the seat cushion and the valve and configured to measure a pressure within the seat cushion.

In one example, the valve control module is configured to closed the valve for a first period, and the system further comprises an occupant weight module configured to determine a weight of an occupant in the seat based on a difference between a first value of the seat cushion pressure measured at a first time during the first period and a second value of the seat cushion pressure measured at a second time during the first period.

In one example, the system further comprises an impact detection module configured to detect when the vehicle is involved in a frontal impact based on at least one of a distance to an object in front of the vehicle, a speed of the vehicle, an acceleration of the vehicle, and a pressure within a front bumper of the vehicle. In addition, the valve control module closes the valve to prevent airflow out of the seat cushion when the vehicle is involved in a frontal impact.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a sectioned side view of an occupant on the seat bottom of the seat assembly of FIG. 1;

FIG. 6 is a sectioned top view of one example of the seat bottom of the seat assembly of FIG. 1;

FIG. 7 is a sectioned top view of another example of the seat bottom of the seat assembly of FIG. 1;

FIG. 8 is a sectioned side view of an occupant on another example of a seat bottom according to the present disclosure;

FIG. 9 is a section top view of the seat bottom of FIG. 8;

In the drawings, reference numbers may be reused to identify similar and/or identical elements.

DETAILED DESCRIPTION

Figure 2:
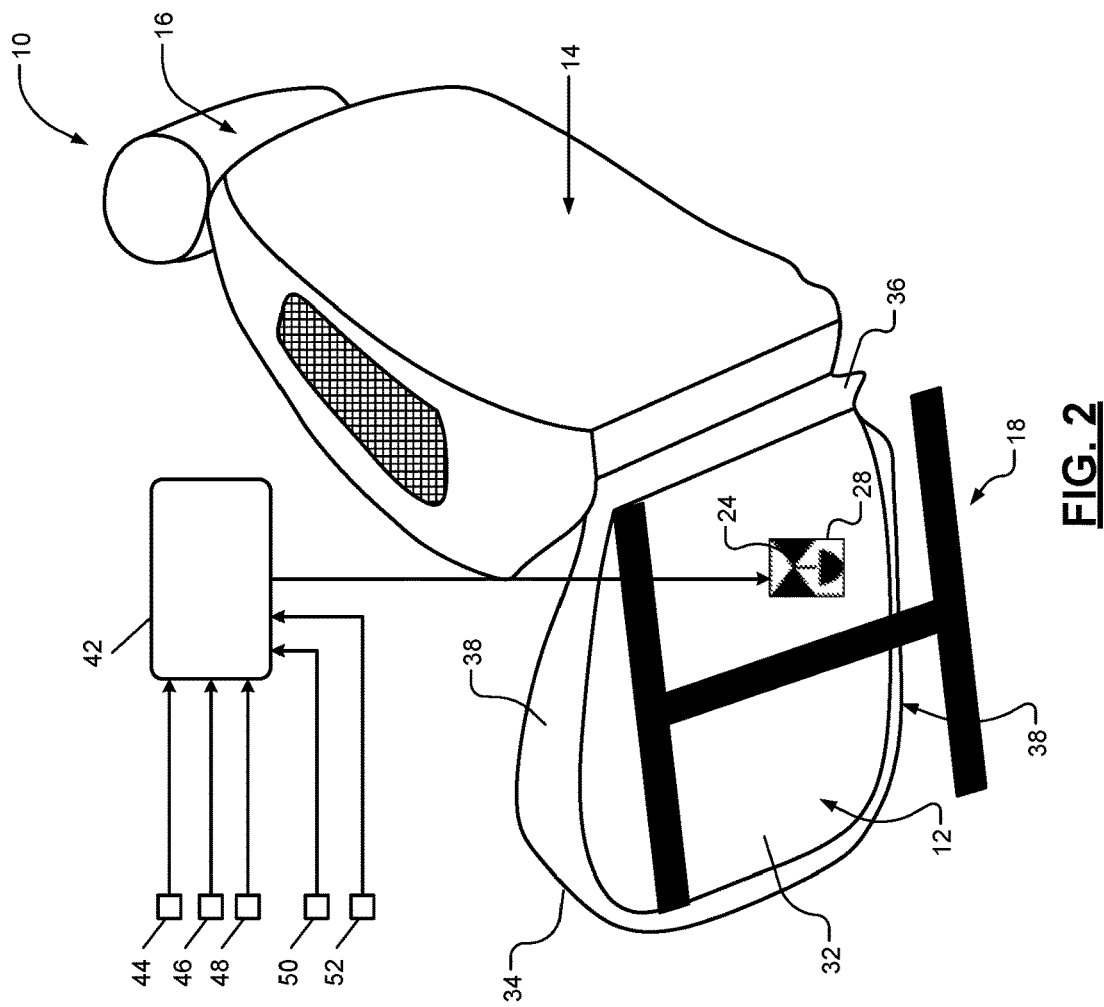
FIG. 2 is a bottom perspective view of the seat assembly of FIG. 1.
Figure 1:
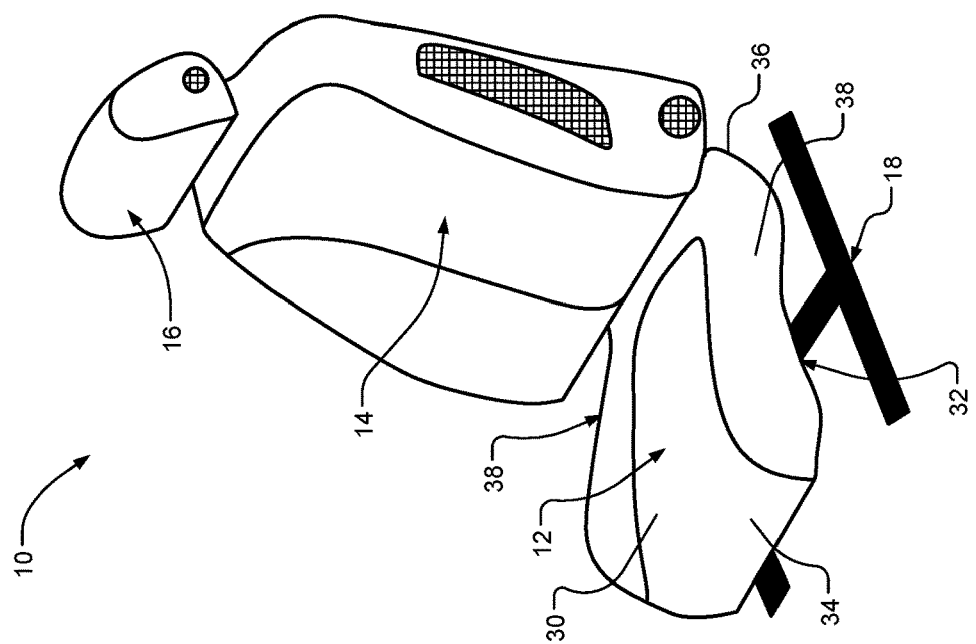
FIG. 1 is a top perspective view of an example seat assembly according to the present disclosure.

A seat bottom of a seat assembly according to the present disclosure includes a seat cushion, a seat cover completely enclosing the seat cushion, and an electronically-controlled valve extending through the seat cover. The seat cover is made of a material that is air impermeable (i.e., prevents airflow therethrough) or a material (e.g., leather) with sufficiently low air permeability to inhibit airflow therethrough. The valve allows airflow out of the seat cushion when the valve is open, and the valve prevents airflow out of the seat cushion when the valve is closed. A control system according to the present disclosure closes the valve when the vehicle is involved in a frontal impact to reduce the amount by which the seat cushion deflects downward due to the pressure applied by an occupant.

A control system according to the present disclosure may also use the seat bottom described above to determine the weight of the occupant. In one example, the control system closes the valve when an occupant is about to sit in the seat and determines the weight of the occupant based on changes in the pressure within the seat cushion while the valve is closed. The cushion pressure is measured using a pressure sensor that is located in the seat cushion or the valve. Since the pressure sensors is integrated into the seat cushion instead of placed below the seat cushion, the packaging space required by the seat assembly is reduced.

Referring now to FIGS. 1-4, a seat assembly 10 for a vehicle includes a seat bottom 12, a seat back 14, a headrest 16, and a seat frame 18. In the example shown, the seat bottom 12 mounted to the seat frame 18, the seat back 14 is attached to the seat bottom 12, and the headrest 16 is attached to the seat back 14. In various implementations, the seat frame 18 includes a first portion to which the seat bottom 12 is mounted, a second portion to which the seat back 14 is mounted, and a hinge that pivotally connects the first and second portions of the seat frame 18 to one another.

The seat bottom 12 includes a seat cushion 20 (FIGS. 3 and 4), a seat cover 22 enclosing the seat cushion 20, an electronically-controlled valve 24 (FIG. 2) extending through the seat cover 22, and a pressure sensor 26 (FIG. 4) disposed within the seat cushion 20. The seat cushion 20 is made of a cushion material such as foam. The seat cover 22 completely encloses the seat cushion 20 except for an opening 28 in the seat cover 22 through which the valve 24 extends. In addition, the seat cover 22 is air impermeable or has sufficiently low air permeability to inhibit airflow therethrough, and therefore the seat cover 22 forms a barrier to airflow out of the seat cushion 20. The seat cover 22 may be made from fabric.

Figure 10:
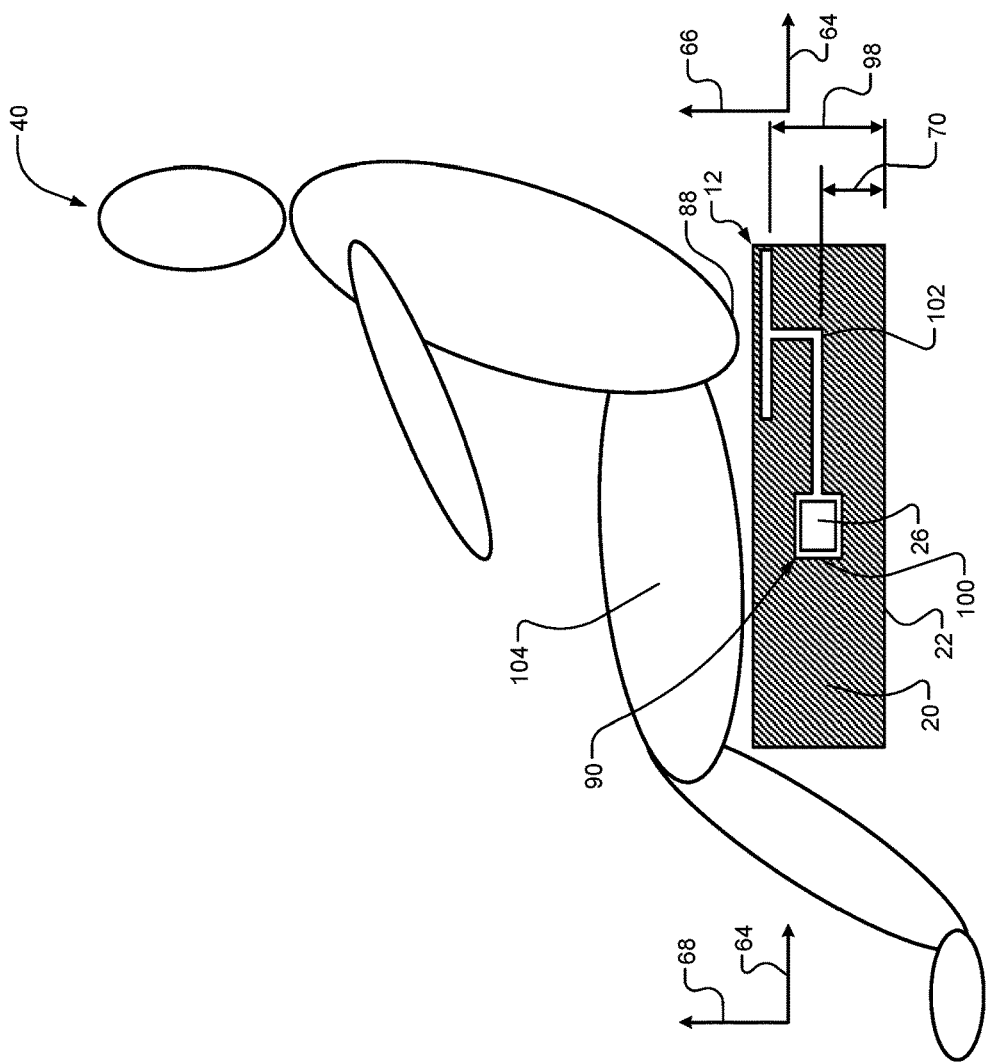
FIG. 10 is a sectioned side view of an occupant on another example of a seat bottom according to the present disclosure.

The seat cover 22 forms a top surface 30 of the seat bottom 12, a bottom surface 32 of the seat bottom 12, a front surface 34 of the seat bottom 12, a rear surface 36 of the seat bottom 12, and side surfaces 38 of the seat bottom 12. The bottom surface 32 of the seat bottom 12 is in direct contact with and supported by the seat frame 18. The top surface 30 of the seat bottom 12 contacts and supports an occupant 40 in the seat assembly 10 as shown in FIGS. 5, 8, and 10.

Referring again to FIGS. 1-4, the valve 24 allows airflow out of the seat cushion 20 through the valve 24 when the valve 24 is open, and the valve 24 prevents airflow out of the seat cushion 20 through the valve 24 when the valve 24 is closed. The vehicle includes a body control module (BCM) 42 that controls the position of the valve 24. In one example, the BCM 42 generates a valve control (VC) signal indicating a target position of the valve 24, and the BCM 42 outputs the VC signal to the valve 24 in order to control the position (e.g., opening area) of the valve 24. The BCM 42 closes the valve 24 to determine the weight of the occupant 40 and/or to minimize the amount by which the seat cushion 20 deflects downward due to the weight of the occupant 40 when the vehicle is involved in a frontal impact.

The pressure sensor 26 measures the pressure within the seat cushion 20, generates a cushion pressure (CP) signal indicating the seat cushion pressure, and outputs the CP signal to the BCM 42. The BCM 42 uses the CP signal to determine the weight of the occupant 40. The pressure sensor 26 may be a single pressure sensor or may include a plurality of pressure sensors.

The vehicle includes a number of other sensors that provide inputs to the BCM 42. A door position sensor 44 detects a position of a door (not shown) of the vehicle closest to the seat assembly 10, generates a door position (DP) signal indicating the door position, and outputs the DP signal to the BCM 42. The door position sensor 44 may be a proximity sensor.

An object distance sensor 46 detects a distance to an object within a vicinity of the vehicle, generates an object distance (OD) signal indicating the object distance, and outputs the OD signal to the BCM 42. In one example, the object distance sensor 46 detects distances to objects in front of the vehicle. The object distance sensor 46 may be a LIDAR sensor or an optical sensor.

A bumper pressure sensor 48 measures the pressure within a front bumper of the vehicle, generates a bumper pressure (BP) signal indicating the front bumper pressure, and outputs the BP signal to the BCM 42. A vehicle speed sensor 50 measures the speed of the vehicle, generates a vehicle speed (VS) signal indicating the vehicle speed, and outputs the VS signal to the BCM 42. A vehicle acceleration sensor 52 measures the acceleration of the vehicle, generates a vehicle acceleration (VA) signal indicating the vehicle acceleration, and outputs the VA signal to the BCM 42. The vehicle acceleration sensor 52 may be mounted in the front structure of the vehicle or at another location in the vehicle.

Figure 3:
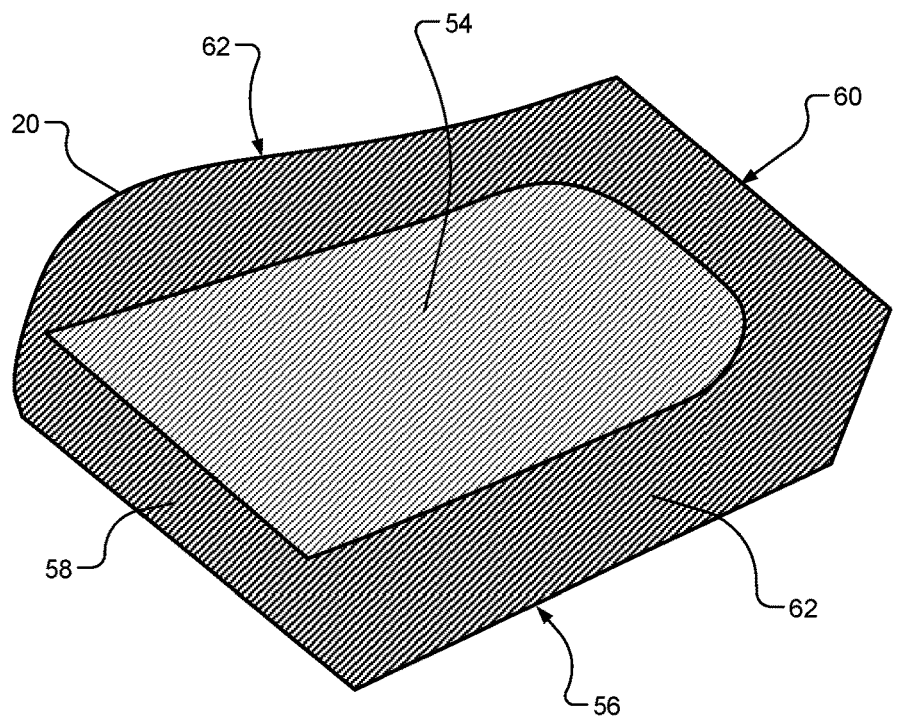
FIG. 3 is a perspective view of a seat cushion of the seat assembly of FIG. 1.
Figure 4:
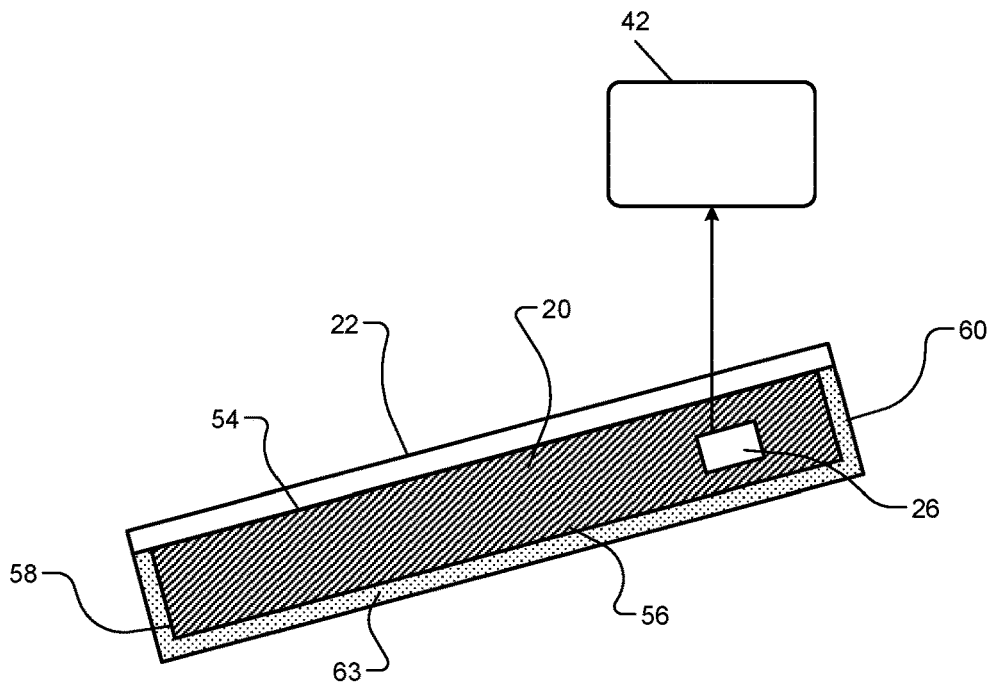
FIG. 4 is a section view of the seat bottom of the seat assembly of FIG. 1.

Referring now to FIGS. 3 and 4, the seat cover 22 is adhered to the entire exterior surface of the seat cushion 20 except for a top surface 54 of the seat cushion 20. Thus, the seat cover 22 is attached to a bottom surface 56 of the seat cushion 20, a front surface 58 of the seat cushion 20, a rear surface 60 of the seat cushion 20, and side surfaces 62 of the seat cushion 20 using an adhesive 63 (e.g., glue). Since the seat cover 22 is not adhered to the top surface 54 of the seat cushion 20, the seat cover 22 may not deflect downward as much as the top surface 54 of the seat cushion 20 deflects downward when a downward force is applied to the seat bottom 12.

Referring now to FIGS. 5, 6, and 7, the seat bottom 12 and the occupant 40 are shown relative to a longitudinal axis 64, a lateral axis 66, and a vertical axis 68. The longitudinal axis 64 extends in a fore-aft direction of the vehicle. The lateral axis 66 extends in a side-to-side direction of the vehicle. The vertical axis 68 extends in an up-down direction of the vehicle. In the examples shown, the entire seat cushion 20 is filled with a cushion material (e.g., foam) except for in the space occupied by the pressure sensor 26.

As shown in FIG. 5, the pressure sensor 26 is located at a first height 70 from the bottom surface 32 of the seat bottom 12. In addition, as shown in FIG. 6, the pressure sensor 26 may be a single sensor, and the pressure sensor 26 may be located along a longitudinal centerline 72 of the seat cushion 20 adjacent to a rear end 74 of the seat cushion 20. Alternatively, as shown in FIG. 7, the pressure sensor 26 may include first and second pressure sensors 26-1 and 26-2, which may be located on opposite sides the longitudinal centerline 72 of the seat cushion 20 adjacent to the rear end 74 of the seat cushion 20.

Referring now to FIGS. 8 and 9, in various implementations, the seat cushion 20 defines an internal void or air space 78 inside of the seat cushion 20, and the pressure sensor 26 is disposed within the internal void 78. Airflow travels faster through the internal void 78 than it does through the cushion material of the seat cushion 20. Thus, providing the internal void 78 around the pressure sensor 26 may improve the response time of the pressure sensor 26.

The internal void 78 includes a lateral passage 80 disposed at the first height 70, a pair of longitudinal passages 82 disposed at a second height 84, and a vertical passage 86 extending between the lateral passage 80 and the longitudinal passages 82. The second height 84 is greater than the first height 70. The pressure sensor 26 is disposed within the lateral passage 80 along the longitudinal centerline 72 of the seat cushion 20.

The lateral passage 80 and the vertical passage 86 are located adjacent to the rear end 74 of the seat cushion 20. Thus, when the occupant 40 is sitting on the seat bottom 12, the lateral passage 80 and the vertical passage 86 are located directly below a bottom 88 of the occupant 40. Since the bottom 88 of the occupant 40 applies more pressure to the seat bottom 12 than any other part of the occupant 40, any pressure wave due to the occupant 40 sitting or submerging in the seat bottom 12 is likely to originate at the bottom 88. Thus, by locating the lateral passage 80 and the vertical passage 86 directly below a bottom 88, the response time of the pressure sensor 26 may be improved.

Figure 11:
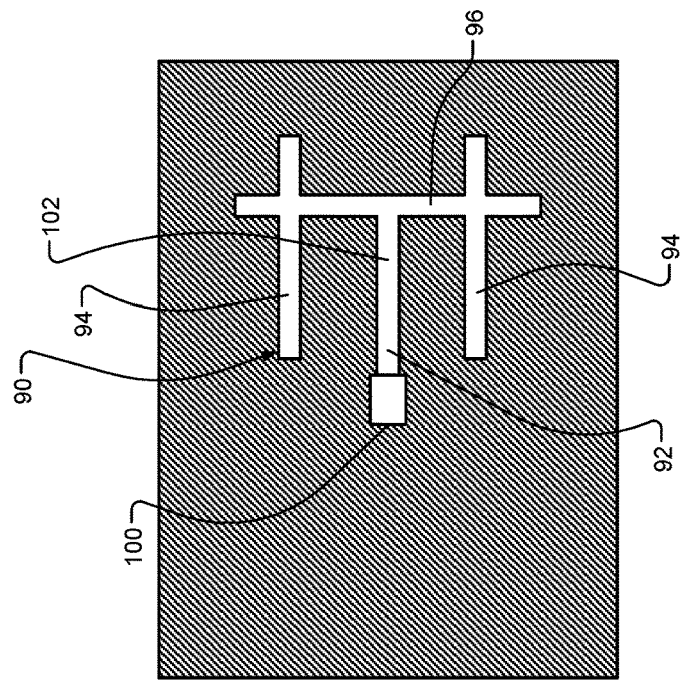
FIG. 11 is a section top view of the seat bottom of FIG. 9.

Referring now to FIGS. 10 and 11, in various implementations, the seat cushion 20 defines another internal void or air space 90 inside of the seat cushion 20, and the pressure sensor 26 is disposed within the internal void 90. The internal void 90 includes a first longitudinal passage 92, a pair of second longitudinal passages 94 disposed on opposite sides of the first longitudinal passage 92, and a vertical passage 96 extending between the first longitudinal passage 92 and the second longitudinal passages 94. The first longitudinal passage 92 is disposed at the first height 70, and the second longitudinal passages are disposed at a second height 98 that is greater than the first height 70.

The first longitudinal passage 92 has a first end 100 and a second end 102 opposite of the first end 100. The first end 100 of the first longitudinal passage 92 is closer to a front end 73 of the seat cushion 20 than the rear end 74 of the seat cushion 20. The second end 102 of the first longitudinal passage 92 is adjacent to the rear end 74 of the seat cushion 20. The pressure sensor 26 is located at the first end 100 of the first longitudinal passage 92.

When the occupant 40 is sitting on the seat bottom 12, the second longitudinal passages, the vertical passages, and the second end 102 of the first longitudinal passage 92 are located directly below the bottom 88 of the occupant 40. Thus, at least a portion of the internal void 90 is located where any pressure wave due to the occupant 40 sitting or submerging in the seat bottom 12 is likely to originate. In addition, when the occupant 40 is sitting on the seat bottom 12, the first end 100 of the first longitudinal passage 92, and therefore the pressure sensor 26, are located between and directly below thighs 104 of the occupant 40. This allows the pressure wave to travel a longer distance before reaching the pressure sensor 26 to attenuate noise in the response of the pressure sensor 26.

Figure 12:
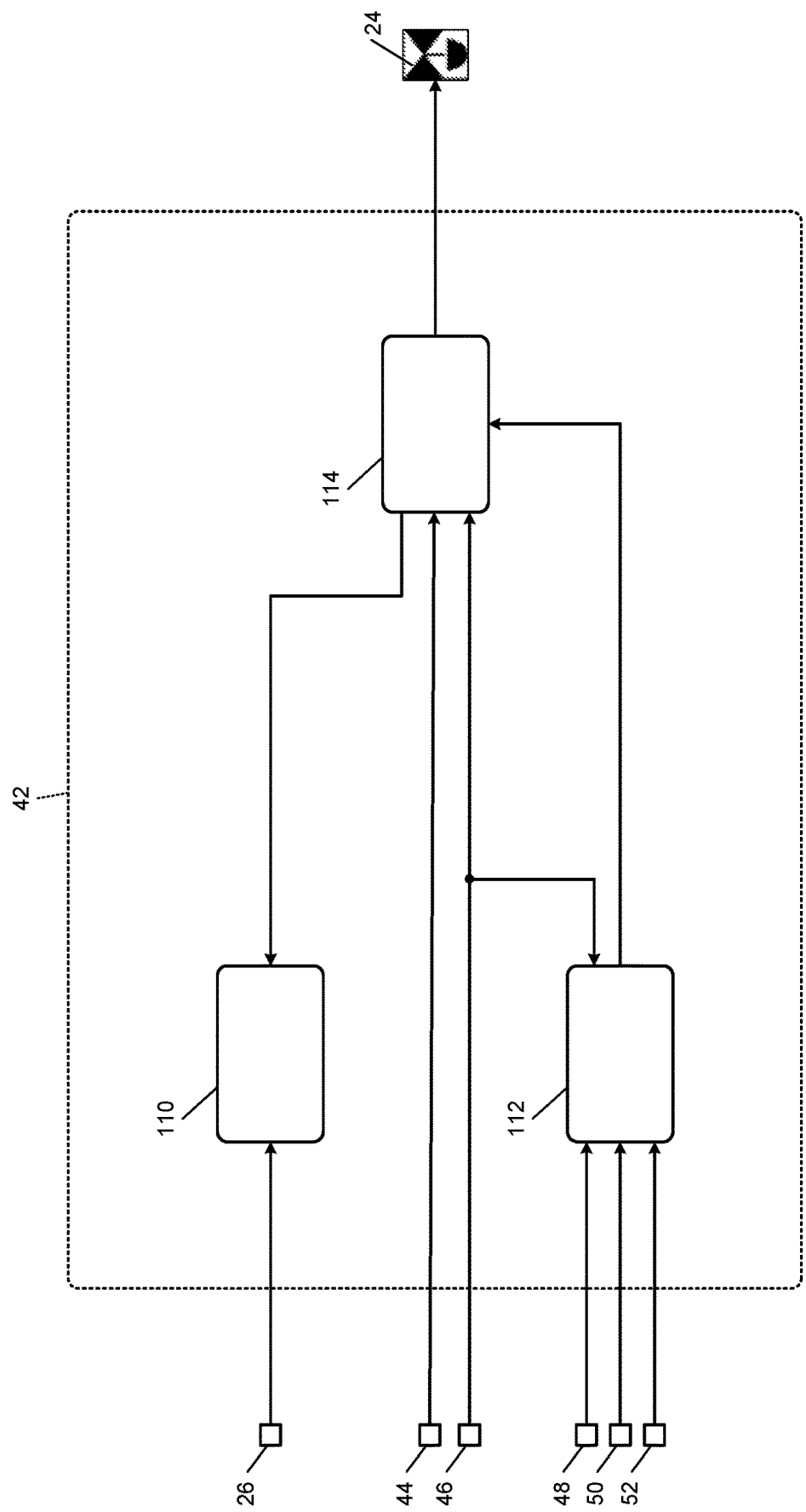
FIG. 12 is a functional block diagram of a body control module according to the present disclosure.

Referring now to FIG. 12, an example implementation of the BCM 42 includes an occupant weight module 110, an impact detection module 112, and a valve control module 114. The occupant weight module 110 determines the weight of the occupant 40 based on the seat cushion pressure from the pressure sensor 26. The impact detection module 112 determines when the vehicle is involved in a frontal impact or about to be involved in a frontal impact. The valve control module 114 controls the position of the valve 24 by generating the VC signal and outputting the VC signal to the valve 24.

Figure 13:
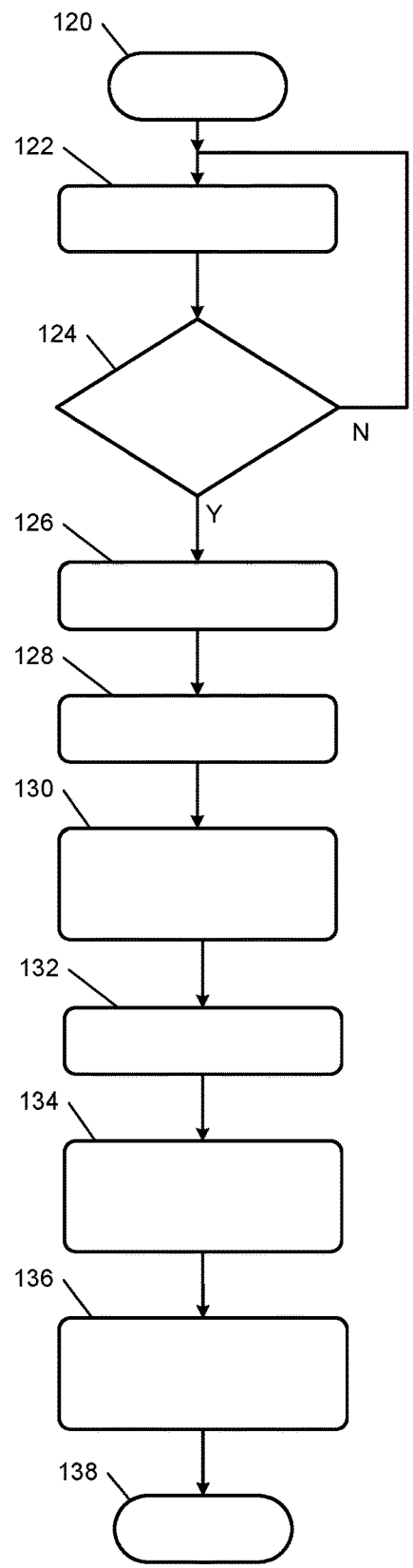
FIG. 13 is a flowchart illustrating an example method of determining the weight of an occupant sitting in a seat assembly and adjusting a passenger restraint system based on the occupant's weight according to the present disclosure.

Referring now to FIG. 13, an example method of determining the weight of the occupant 40 based on the seat cushion pressure from the pressure sensor 26 begins at 120. The method is described in the context of the modules of FIG. 12. However, the particular modules that perform the steps of the method may be different than the modules mentioned below and/or one or more steps of the method may be implemented apart from the modules of FIG. 12.

At 122, the door position sensor 44 measures the position of the door closest to the seat assembly 10. At 124, the occupant weight module 110 determines whether the door is opened. If the door is opened, the method continues at 126. Otherwise, the method returns to 122 and continues to measure the position of the door.

In this example, it is assumed that the occupant 40 is about to sit in the seat assembly 10 when the door is opened. However, other indicators may be used in addition to or instead of the door position. For example, the vehicle may include an optical sensor (not shown) that detects an occupant approaching the door, and the method may continue to 126 when the optical sensor makes such a detection.

At 126, the valve control module 114 closes the valve 24 for a first period (e.g., 500 milliseconds). At 128, the pressure sensor 26 measures the seat cushion pressure during the first period. At 130, the occupant weight module 110 determines the weight of the occupant 40 based on the seat cushion pressure measured during the first period.

The occupant weight module 110 may determine the occupant weight based on a difference between a first value of the seat cushion pressure measured at a first time during the first period and a second value of the of the seat cushion pressure measured at a second time during the first period. In one example, the first time is the time when the valve 24 is initially closed, and the second time is a predetermined period (e.g., 100 milliseconds) after the first time. The occupant weight module 110 may determine the occupant weight based on a predetermined relationship between the difference between the first and second values of the seat cushion pressure and occupant weight.

At 132, the valve control module 114 opens the valve 24. The valve control module 114 may not open the valve 24 until the first period ends. At 134, an airbag control module (not shown) adjusts the inflation pressure of an airbag (now shown) for an occupant in the seat assembly 10 based on the occupant weight from the occupant weight module 110. The airbag control module may adjust the airbag inflation pressure using a predetermined relationship between occupant weight and airbag inflation pressure. In one example, the airbag control module sets the airbag inflation pressure to a higher value for higher occupant weights sets the airbag inflation pressure to a lower value for lower occupant weights. The airbag control module may be part of or separate from the BCM 42.

At 136, a seatbelt retractor control module (not shown), based on the occupant weight determined by the occupant weight module 110, adjusts a retraction force applied by a seatbelt retractor (not shown) to a seatbelt 140 (FIGS. 17 and 18) associated with the seat assembly 10. The seatbelt retractor control module may adjust the seatbelt retraction force using a predetermined relationship between occupant weight and seatbelt retraction force. In one example, the airbag control module sets the seatbelt retraction force to a higher value for higher occupant weights sets the airbag inflation pressure to a lower value for lower occupant weights. The airbag control module may be part of or separate from the BCM 42.

Figure 14:
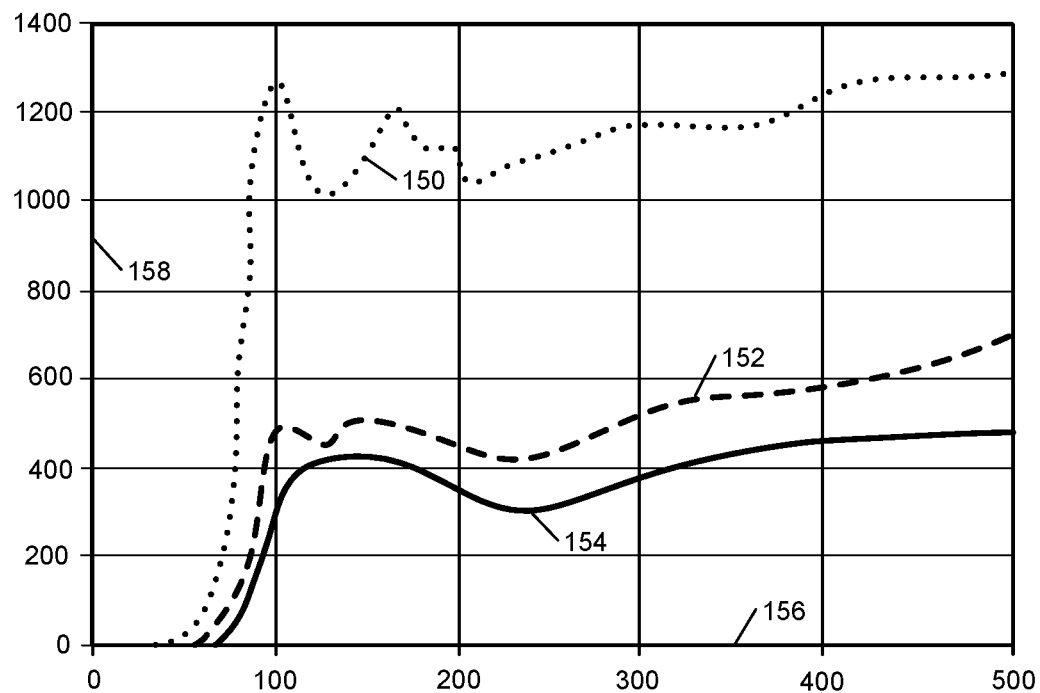
FIGS. 14 and 15 are graphs indicating pressures within a seat cushion and forces acting on the seat cushion when a valve is closed to inhibit airflow out of the seat cushion and three different occupants sit on the seat cushion.

Referring now to FIG. 14, a first seat cushion pressure signal 150, a second seat cushion pressure signal 152, and a third seat cushion pressure signal 154 are plotted with respect to an x-axis 156 and a y-axis 158. The x-axis 156 represents time in milliseconds (ms), and the y-axis 158 represents seat cushion pressure in Pascal (Pa).

The first seat cushion pressure signal 150 represents the seat cushion pressure measured by the seat cushion pressure 26 when the method of FIG. 13 is performed and the occupant 40 is a $95^{th}$ percentile male according to vehicle design standards. The second seat cushion pressure signal 152 represents the seat cushion pressure measured by the seat cushion pressure 26 when the method of FIG. 13 is performed and the occupant 40 is a $50^{th}$ percentile male according to vehicle design standards. The third seat cushion pressure signal 154 represents the seat cushion pressure measured by the seat cushion pressure 26 when the method of FIG. 13 is performed and the occupant 40 is a $5^{th}$ percentile female according to vehicle design standards.

The valve control module 114 may close the valve 24 at a time of 0 seconds or a time between 0 seconds and about 50 ms. At about 50 ms, the occupant 40 sits in the seat assembly 10 as indicated by the upward spikes in the seat cushion pressure signals 150, 152, 154. Between about 100 ms and about 150 ms, the upward spikes reach their peak values. While the seat cushion pressure signals 150, 152, 154 exhibit some oscillations and magnitude increases after about 150 ms, these oscillations and magnitude increase are much smaller than the initial spike.

Notably, the peak values of the spikes in the seat cushion pressure signals 150, 152, 154 are different from one another. For example, the spike in the first seat cushion pressure signal 150 has a peak value of about 1250 Pa, the spike in the second seat cushion pressure signal 152 has a peak value of about 500 Pa, and the spike in the third seat cushion pressure signal 154 has a peak value of about 425 Pa. Thus, the occupant weight module 110 may determine the occupant weight by comparing the peak value of the upward spike in the seat cushion pressure signal to predetermined ranges associated with occupant weight. Alternatively, the occupant weight module 110 may determine a difference between the peak value of the spike and the starting value of the spike (0 Pa in FIG. 14), and determine the occupant weight by comparing that different to predetermined ranges associated with occupant weight. Alternatively, the occupant weight module 110 may determine an average value of a plurality of samples of the seat cushion pressure signal, and determine the occupant weight by comparing that average value to predetermined ranges associated with occupant weight. The samples of the seat cushion pressure signal may be taken during and/or after the spike in the seat cushion pressure signal.

Figure 15:
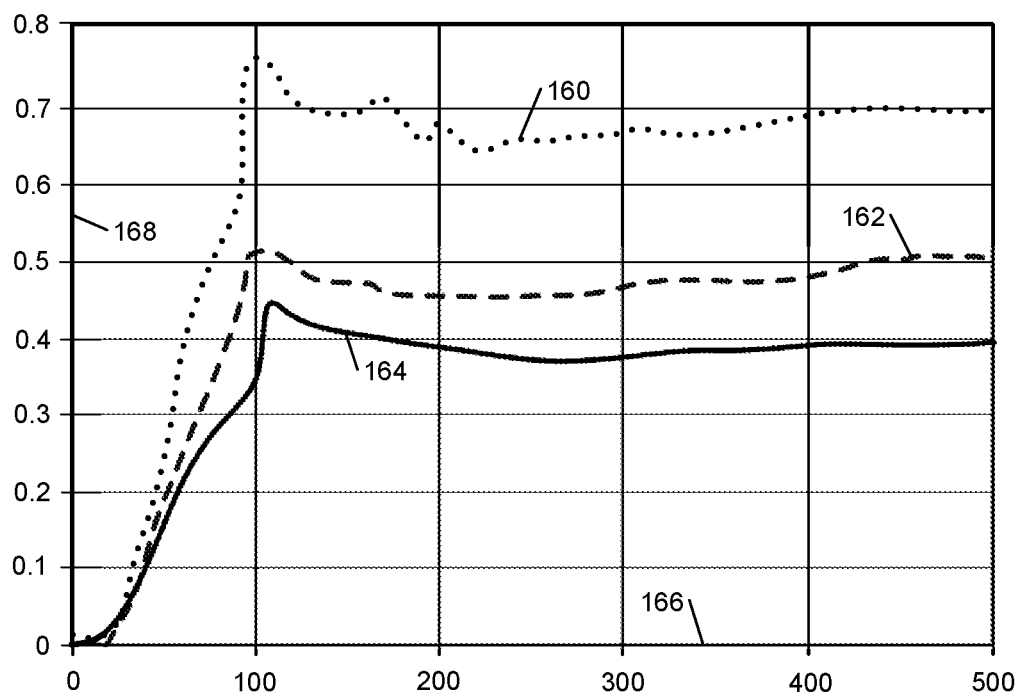

Referring now to FIG. 15, a first cushion contact force signal 160, a second cushion contact force signal 162, and a third cushion contact force signal 164 are plotted with respect to an x-axis 166 and a y-axis 168. The x-axis 166 represents time in milliseconds (ms), and the y-axis 168 represents seat cushion contact force in kilonewtons (kN).

The first cushion contact force signal 160 represents the seat cushion pressure when the method of FIG. 13 is performed and the occupant 40 is a 95$^{th}$ percentile male according to vehicle design standards. The second cushion contact force signal 162 represents the seat cushion pressure when the method of FIG. 13 is performed and the occupant 40 is a 50$^{th}$ percentile male according to vehicle design standards. The third cushion contact force signal 164 represents the seat cushion pressure when the method of FIG. 13 is performed and the occupant 40 is a 5$^{th}$ percentile female according to vehicle design standards.

The valve control module 114 may close the valve 24 at a time of 0 seconds or a time between 0 seconds and about 50 ms. At about 50 ms, the occupant 40 sits in the seat assembly 10 as indicated by the upward spikes in the cushion contact force signals 160, 162, 164. Between about 100 ms and about 125 ms, the upward spikes reach their peak values. While the cushion contact force signals 160, 162, 164 exhibit some oscillations and magnitude increases after about 125 ms, these oscillations and magnitude increase are much smaller than the initial spike.

Figure 16:
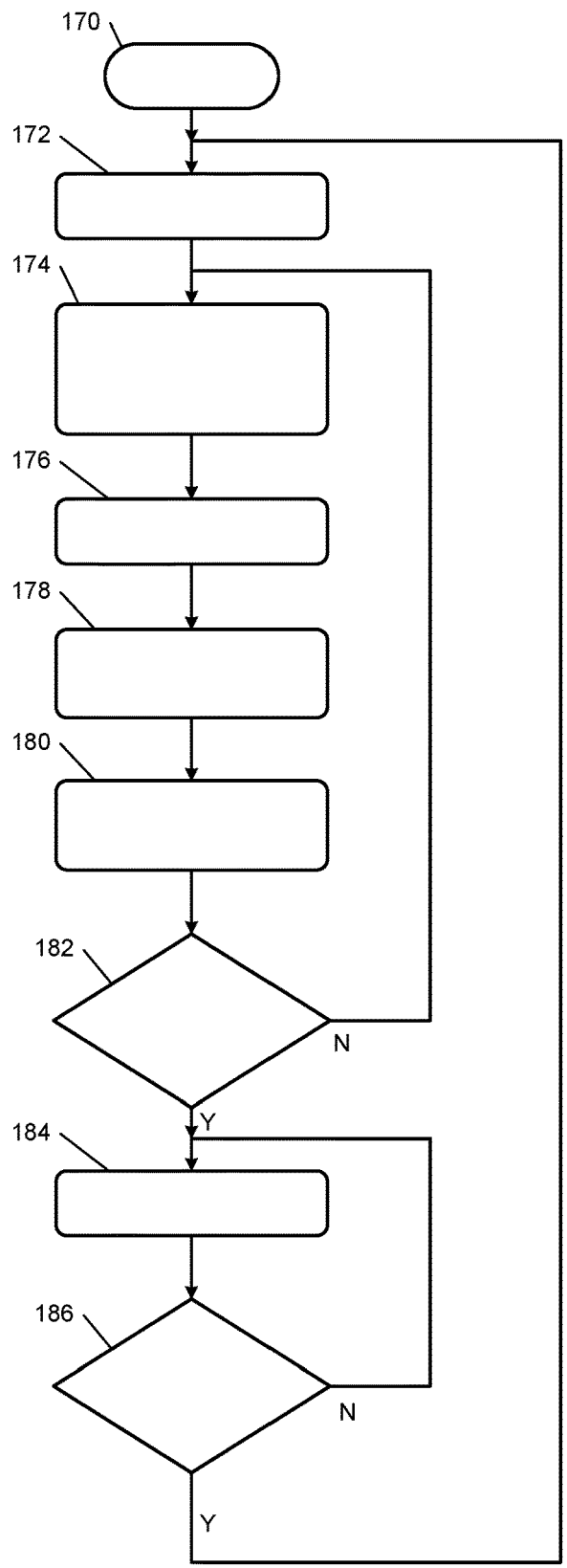
FIG. 16 is a flowchart illustrating an example method of controlling a valve to inhibit airflow out of a seat cushion in a vehicle seat assembly according to the present disclosure.

Referring now to FIG. 16, an example method of controlling the valve 24 to minimize an amount by which the occupant 40 submerges in the seat bottom 12 during a frontal impact begins at 170. The method is described in the context of the modules of FIG. 12. However, the particular modules that perform the steps of the method may be different than the modules mentioned below and/or one or more steps of the method may be implemented apart from the modules of FIG. 12.

At 172, the valve control module 114 opens the valve 24. The valve control module 114 may keep the valve 24 open when the occupant weight module 110 is not determining the weight of the occupant 40 and the vehicle is not involved in a frontal impact. At 174, the object distance sensor 46 measures the distance between the vehicle any object in front of the vehicle. At 176, the vehicle speed sensor 50 measures the speed of the vehicle. At 178, the vehicle acceleration sensor 52 measures the acceleration of the vehicle. At 180, the bumper pressure sensor 48 measures the pressure within the front bumper of the vehicle.

At 182, the impact detection module 112 determines whether the vehicle is involved in, or about to be involved in, a frontal impact. The impact detection module 112 may make this determination based on the object distance from the object distance sensor 46, the bumper pressure from the bumper pressure sensor 48, the vehicle speed from the vehicle speed sensor 50, and/or the vehicle acceleration from the vehicle acceleration sensor 54. If the vehicle is involved in a frontal impact or is about to be involved in a frontal impact, the method continues at 184. Otherwise, the method returns to 174.

The impact detection module 112 may determine that the vehicle is or will be involved in a frontal impact when the object distance is less than a predetermined distance, the bumper pressure is greater than a predetermined pressure, and/or the vehicle acceleration (or deceleration) is greater than a predetermined acceleration (or deceleration). Additionally or alternatively, the impact detection module 112 may predict a period between a current time a future time at which the vehicle is likely to impact an object based on the object distance, the vehicle speed, and/or the vehicle acceleration, and determine that that the vehicle is or will be involved in a frontal impact when the period is less than a predetermined threshold. In one example, the impact detection module 112 predicts future values of the vehicle speed based on the current vehicle speed and the vehicle acceleration, and the impact detection module 112 predicts the period based on the object distance, the current vehicle speed, and the predicted future values of the vehicle speed.

At 184, the valve control module 114 closes the valve 24 to prevent airflow out of the seat cushion 20 and thereby minimize the amount by which the seat cushion 20 deflects downward due to the weight of the occupant 40 when the vehicle is involved in a frontal impact. This minimizes the amount by which the occupant 40 submerges in the seat bottom 12 when the vehicle is involved in a frontal impact. The method ends at 186.

Figure 17:
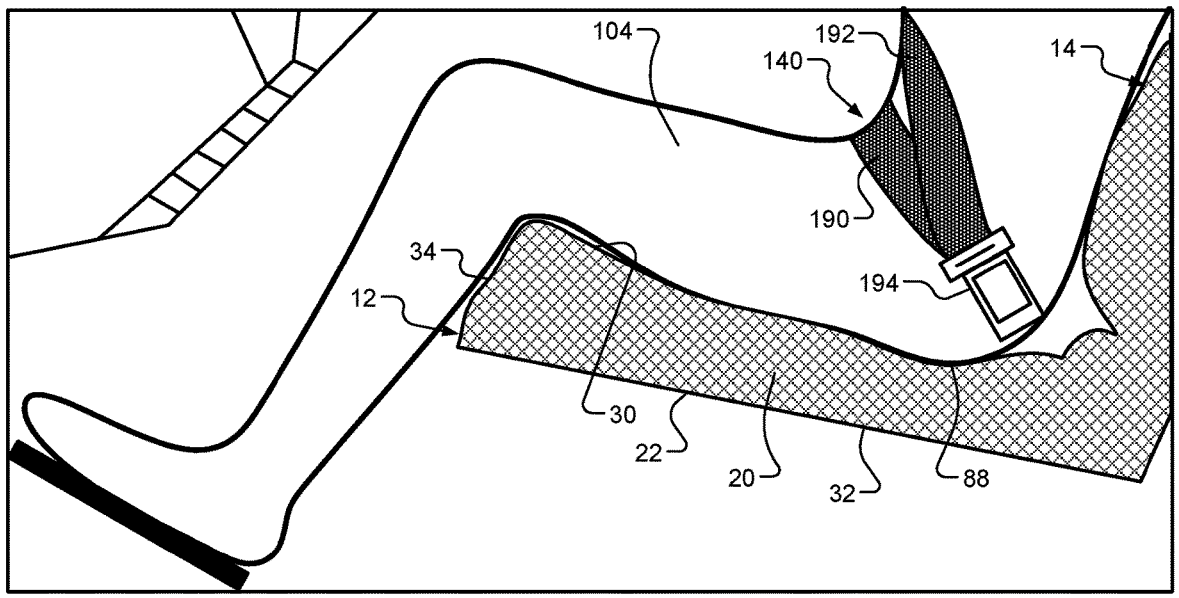
FIG. 17 is a sectioned side view of an occupant sitting in a seat assembly according to the present disclosure.
Figure 18:
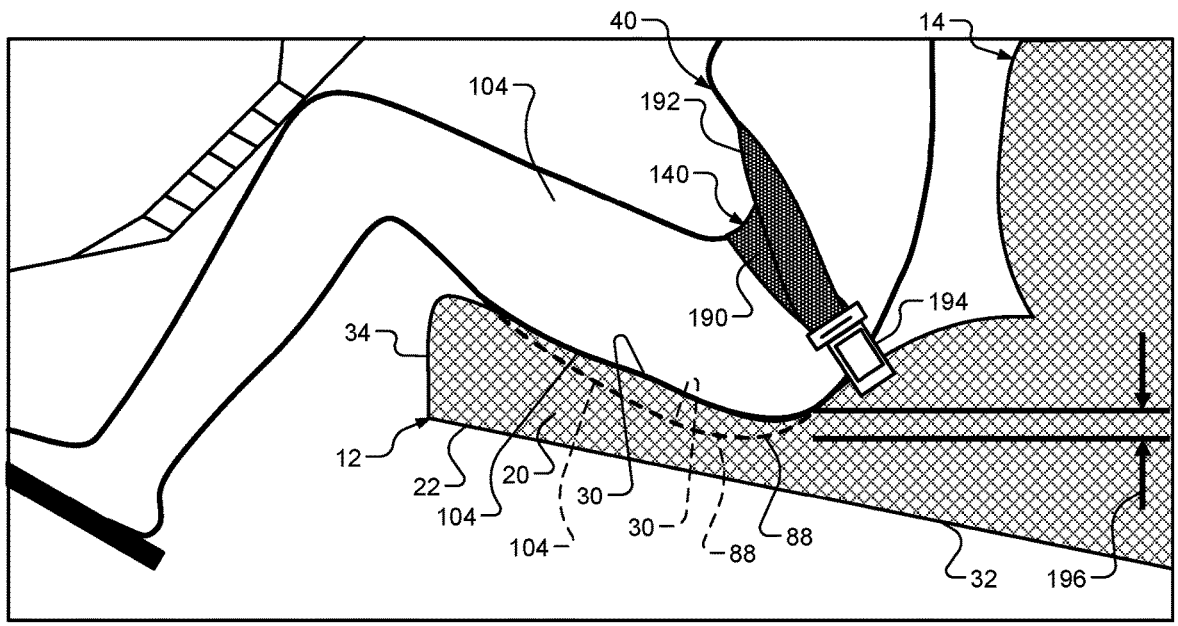
FIG. 18 is a sectioned side view illustrating a difference between deflection of a seat cushion according to the present disclosure and deflection of another seat cushion.

Referring now to FIGS. 17 and 18, the seat bottom 12 and the seat back 14 are shown with the occupant 40 sitting on the seat bottom 12 and secured to the seat bottom 12 using the seatbelt 140. The seatbelt 140 includes a lap belt portion 190, a shoulder belt portion 192, and a buckle 194. The buckle 194 is secured to a body structure (not shown) of the vehicle.

FIG. 17 shows the occupant 40 sitting on the seat bottom 12 and resting against the seat back 14 when the vehicle is not involved in normal driving conditions (e.g., when the vehicle is not involved in an impact). FIG. 18 shows the occupant 40 submerging in the seat bottom 12 and leaning away from the seat back 14 when the vehicle is involved in a frontal impact. In addition, a solid line represents the top surface 30 of the seat bottom 12 and the bottom surfaces of the bottom 88 and thighs 104 of the occupant 40 when the valve 24 is controlled using the method of FIG. 16. Further, a dashed line represents the top surface 30 of the seat bottom 12 and the bottom surfaces of the bottom 88 and thighs 104 of the occupant 40 when the valve 24 is omitted and the seat cover 22 is replaced with a conventional seat cover.

As shown in FIG. 18, the amount by which the bottom 88 and thighs 104 of the occupant 40 submerge in the seat cushion 20 during a frontal impact is reduced by a distance 196 when the valve 24 is controlled using the method of FIG. 16 relative to when the valve 24 is omitted and the seat cover 20 is replaced with a conventional seat cover. In turn, the height of the pelvic bone of the occupant 40 relative to the buckle 194 may not decrease as much as it would otherwise, which reduces the risk that the occupant 40 may submarine past the lap belt portion 190 during a frontal impact.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for a seat of a vehicle, the system comprising:
a seat cushion forming at least part of a bottom of the seat;

a seat cover enclosing the seat cushion and forming a barrier to airflow out of the seat cushion, the seat cover forming a top surface of the seat bottom, a bottom surface of the seat bottom, and side surfaces of the seat bottom; and a valve extending through the seat cover and configured to regulate airflow out of the seat cushion through the valve;

a valve control module configured to control a position of the valve;

at least one pressure sensor disposed within at least one of the seat cushion and the valve and configured to measure a pressure within the seat cushion; and an occupant weight module configured to determine a weight of an occupant in the seat based on the seat cushion pressure, wherein:

the valve control module is configured to close the valve for a first period; and the occupant weight module is configured to determine the occupant weight based on a difference between a first value of the seat cushion pressure measured at a first time during the first period and a second value of the seat cushion pressure measured at a second time during the first period.

2. The system of claim 1 wherein the seat cover is air impermeable.

3. The system of claim 1 wherein the seat cover completely surrounds the seat cushion except for an opening in the seat cover through which the valve extends.

4. The system of claim 1 wherein the seat cover is adhered to the entire exterior surface of the seat cushion except for a top surface of the seat cushion.

5. The system of claim 1 wherein the at least one pressure sensor includes two pressure sensors disposed within the seat cushion at the same vertical location, the same longitudinal location, and different lateral locations.

6. A system for a seat of a vehicle, the system comprising:
a seat cushion forming at least part of a bottom of the seat;
a seat cover enclosing the seat cushion and forming a barrier to airflow out of the seat cushion, the seat cover forming a top surface of the seat bottom, a bottom surface of the seat bottom, and side surfaces of the seat bottom;
a valve extending through the seat cover and configured to regulate airflow out of the seat cushion through the valve;
a valve control module configured to control a position of the valve; and
at least one pressure sensor disposed within at least one of the seat cushion and the valve and configured to measure a pressure within the seat cushion, wherein the seat cushion defines an internal void, and the at least one pressure sensor is disposed within the internal void.

7. The system of claim 6 wherein:
the internal void includes a lateral passage disposed at a first height, a pair of longitudinal passages disposed at a second height that is greater than the first height, and a vertical passage extending between the lateral passage and the longitudinal passages; and
the pressure sensor is disposed within the lateral passage.

8. The system of claim 7 wherein the lateral passage and the vertical passage are configured to be located directly below a bottom of an occupant in the seat.

9. The system of claim 6 wherein:
the internal void includes a first longitudinal passage disposed at a first height, a pair of second longitudinal passages disposed on opposite sides of the first longitudinal passage at a second height that is greater than the first height, and a vertical passage extending between the first longitudinal passage and the second longitudinal passages; and
the pressure sensor is disposed within the first longitudinal passage.

10. The system of claim 9 wherein:
the first longitudinal passage has a first end configured to be disposed below thighs of an occupant in the seat and a second end configured to be disposed directly below a bottom of the occupant; and
the pressure sensor is located at the first end of the first longitudinal passage.

11. The system of claim 1 further comprising a door position module configured to determine a position of a door of the vehicle, wherein the valve control module is configured to close the valve for the first period when the door is opened.

12. A system for a seat of a vehicle, the system comprising:
a seat cushion forming at least part of a bottom of the seat;
a seat cover enclosing the seat cushion and forming a barrier to airflow out of the seat cushion, the seat cover forming a top surface of the seat bottom, a bottom surface of the seat bottom, and side surfaces of the seat bottom;
a valve extending through the seat cover and configured to regulate airflow out of the seat cushion through the valve;
a valve control module configured to control a position of the valve; and
an impact detection module configured to detect when the vehicle is involved in a frontal impact based on at least one of a distance to an object in front of the vehicle, a speed of the vehicle, an acceleration of the vehicle, and a pressure within a front bumper of the vehicle, wherein the valve control module closes the valve to inhibit airflow out of the seat cushion when the vehicle is involved in a frontal impact.

* * * * *